US008645406B2

(12) United States Patent
DeMaris et al.

(10) Patent No.: US 8,645,406 B2
(45) Date of Patent: Feb. 4, 2014

(54) EXPLOITING CONDITIONS TO OPTIMIZE EXPENSIVE DATABASE QUERIES

(75) Inventors: Lincoln DeMaris, Bellevue, WA (US); Anthony Lawrence Jackson, Seattle, CA (US); Dustin Friesenhahn, Bellevue, WA (US); Nathan James Fink, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 914 days.

(21) Appl. No.: 12/101,960

(22) Filed: Apr. 11, 2008

(65) Prior Publication Data

US 2009/0259624 A1    Oct. 15, 2009

(51) Int. Cl.
*G06F 7/00* (2006.01)

(52) U.S. Cl.
USPC ............................... 707/759; 707/765

(58) Field of Classification Search
USPC .......................... 707/765, 759, 761
See application file for complete search history.

(56) References Cited

U.S. PATENT DOCUMENTS

| 5,926,807 | A * | 7/1999 | Peltonen et al. ............... 1/1 |
| 7,143,078 | B2 | 11/2006 | Doherty et al. |
| 7,315,872 | B2 | 1/2008 | Narang et al. |
| 2003/0036927 | A1* | 2/2003 | Bowen ................... 705/4 |
| 2003/0055813 | A1 | 3/2003 | Chaudhuri et al. |
| 2004/0158559 | A1* | 8/2004 | Poltorak ..................... 707/3 |
| 2005/0080770 | A1* | 4/2005 | Lueder et al. ............... 707/3 |
| 2006/0004695 | A1 | 1/2006 | Day et al. |
| 2006/0020579 | A1 | 1/2006 | Freedman et al. |
| 2006/0230032 | A1* | 10/2006 | Brankov et al. ............. 707/3 |
| 2007/0050330 | A1 | 3/2007 | Karn et al. |
| 2007/0073657 | A1 | 3/2007 | Santosuosso |
| 2007/0118501 | A1 | 5/2007 | Yan |
| 2008/0215531 | A1* | 9/2008 | Markl et al. ................ 707/2 |
| 2009/0037923 | A1* | 2/2009 | Smith et al. ............... 718/104 |
| 2009/0070313 | A1* | 3/2009 | Beyer et al. ................ 707/5 |

OTHER PUBLICATIONS

Urhan, et al., "Cost-Based Query Scrambling for Initial Delays", In Proceedings of ACM SIGMOD'98, ACM, 1998.
Seshadri, et al., "Complex Query Decorrelation", Proceedings of the Twelfth International Conference on Data Engineering (ICDE'96), IEEE Computer Society, 1996.
Mishne, et al., "Boosting Web Retrieval through Query Operations", vol. 3408, 2005, Springer Berlin / Heidelberg.

* cited by examiner

*Primary Examiner* — Amy Ng

(57) ABSTRACT

A fallback query mechanism that serves as a way to recover from query conditions (or criteria) that break due to excessively large result sets relative to a preset threshold. The fallback query mechanism detects when a query has failed to execute because the query requested more items from the database (or list) than allowed by the threshold, rewrites the query to examine no more than the threshold number of most recently created items that match one of the indexed filter criteria specified in a view, and then applies one or more of the other filter criteria. The mechanism then reruns the query and displays the results to the user.

20 Claims, 9 Drawing Sheets

EXPLOITING CONDITIONS TO OPTIMIZE EXPENSIVE DATABASE QUERIES

BACKGROUND

The large amounts of data that can be searched can present problems for maintaining not only a favorable user experience but also application efficiency when returning the search results in a reasonable time. Users and applications that search data sources can input search queries that return large amounts of data (e.g., databases, lists, tables, etc.) that can reduce application performance, cause errors or timeouts, and generally, impact operations and user experience.

In order to provide some measure of control over these problems, criteria can be imposed that reduces the amount of data that will be returned. However, these criteria can introduce additional problems. For example, in one application where the query requests a number of items from a database and the number of data items is higher than a configurable threshold, the query is terminated before being run. This is done to prevent the execution of queries that would excessively tax database resources and, consequently, degrade the performance and quality of service. From the perspective of the end user, this means that the ways of looking (the view) at large sets of data can appear to be broken. For example, even if loaded, the view may not display any of the data that matched the criteria specified.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Described is a solution to query conditions that break due to excessively large result sets relative to a preset threshold. The solution provides a fallback query mechanism that serves as a graceful way to recover from this situation. The fallback query mechanism detects when a query has failed to execute because the query requested more items from the database (or list) than allowed by the threshold, rewrites the query to examine no more than the threshold number of most recently created items that match one of the indexed filter criteria specified in a view, and then applies one or more of the other filter criteria. The mechanism then reruns the query and displays the results to the user.

The mechanism examines the criteria and ensures that if at least one of the criteria results in a result set that is lower than the threshold then the query can succeed by using that criterion. If none of the criterion given allow for a result set that does not exceed the threshold, then a computation is performed using one or more of the criteria to generate a limited number of the items to consider. At this time, the most recent items matching one of the criteria (e.g., creation date) are examined to generate a partial set that is lower in count than the threshold. Thus, the partial set can be returned and viewed.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
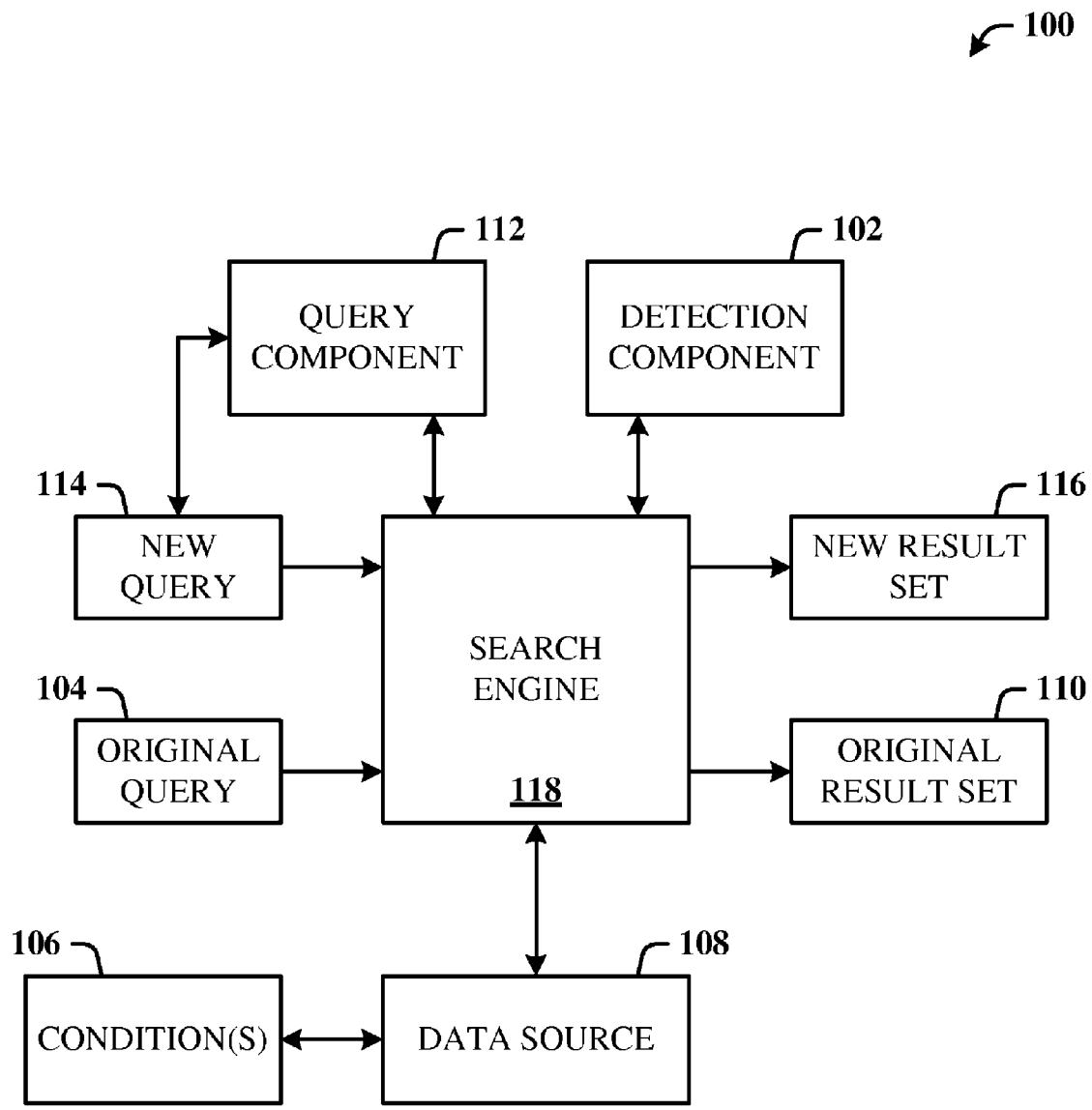
FIG. 1 illustrates a computer-implemented query system in accordance with the disclosed architecture.

The disclosed architecture includes a fallback query mechanism that produces a result set in any instance so that the user (or consumer, e.g., an application) will receive some results to the query. If the query returns results below a predetermined threshold, the system operates as normal. If the query returns results that exceed the threshold, the fallback mechanism detects this excessive threshold event, rewrites and tests the query until the returned results do not exceed the threshold thereby generating a reduced result set. Once a collection of items lower than the threshold is obtained, one or more of the remaining criteria are applied to the reduced result set to return a partial set of results. The fallback mechanism can be configured to operate automatically and/or manually. In the manual instance, the system can suggest and present possible criteria for the user, which may help. The user essentially helps to pick the fallback query. This can be considered a hybrid approach where the system suggests ways to make the query succeed, but the user ultimately provides the criteria.

For example, consider a large document library configured with a threshold of 5000 items. The user loads a particular view that is configured to display all documents in the library with the following criteria: Team=ECM; Date Modified: >Jan. 1, 2006; and, Group by Author.

The initial query returns 6000 items that match the view criteria, which is in excess of a threshold. The query is then terminated, and the server (e.g., SQL) passes an error back to the front end system. Note that the initial query is an indexed query (using the index on the Team field in the database); there are no other indexed queries that could be run (specifically, because there is no index on the "Date Modified" field). The fallback query is run after attempting to run the initial query using all available indices on the query's filter fields. One indexing strategy that can make the fallback query work is to create a compound index of Team and Date modified, for example.

At this point, the fallback query mechanism takes over and generates a query with the following criteria: out of the 5000 most recently created items that match Team=ECM, return items that match Date Modified: >Jan. 1, 2006 and Group by Author. Note that this query relies on a list index existing on the Team field.

The new query succeeds because the number of results returned is capped to the threshold limit. Even though the new query returns a partial result set (that is, items that are not in the "top 5000 most recently created" group will be omitted from the fallback query), generally, the results can be expected to be useful because users are more often interested in the "newest" items in a repository than in the older items.

In other words, queries that are unacceptable according to the rules defined by the server farm (e.g., the query exceeds the maximum number of items a single query can return from the database) are rewritten to optimally satisfy one or more of at least the following constraints: the new (rewritten) query returns at a maximum a result set that does not exceed the threshold, the new query returns results that match the constraints (including filters, groups, and sorts) defined by the original query. For example, the new query returns items that, under the principle of temporal locality, will generally be the most relevant items in the original result set. More specifically, the most recently created documents are returned out of the original set. In another implementation, the criteria can be that the oldest results are the most useful, and so on. The user can incorporate other criteria as desired.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives falling within the spirit and scope of the claimed subject matter.

FIG. 1 illustrates a computer-implemented query system 100 in accordance with the disclosed architecture. The system 100 includes a detection component 102 for detecting when an original query 104 fails due to one or more conditions 106 imposed on a data source against which the original query 104 is run. The one or more conditions 106 can be related to performance of the data source 108. In other words, where processing the original query 104 impacts the performance of the data source 108, such as returning a large original result set 110 that would slow performance, for example, the one or more conditions 106 (e.g., a threshold of result items that can be returned for any query) operate to prohibit processing of the original query 104.

The system 100 can also include a query component 112 for automatically creating a new query 114 based on the original query 114 that when executed, the new query 114 returns a new result set 116 that meets the one or more conditions 106.

The detection component 102 and query component 112 can be implemented in association with a search engine 118 such that if the original query 104 returns the original result set 110 such that the number of items returned in the original result set 110 does not trigger one or more of the conditions 106 (e.g., exceed the threshold number of items in the original result set 110), the functionality provided by the detection component 102 and query component 112 is not activated. Under the number-of-items condition, activation only occurs when the number of items returned in the original result set 110 exceeds the threshold condition.

The query component 112 creates the new query 114 such that when executed, the new query 114 returns the new result set 116 based on conditions 106 imposed on the original query 104. The one or more conditions 106 can include filters, groups, and/or sorts, for example. The one or more conditions include a threshold condition (or threshold) associated with a number of items that can be retuned in the original result set 110 for the original query 104. If the number of items exceed the threshold condition thereby negatively impacting the performance of the data source 108. Note that the data source 108 is intended to include not only the data, but also all management systems and subsystems that organize the data, store the data, and provide access to the data, as in database management systems, for example.

In one implementation, the new result set 116 includes items that are most relevant to the original result set 110 based on temporal locality. In other words, in this case, the new result set 116 includes items most recent in time to the original result set 110. The new result set 116 can be a subset of the original result set 110 and include most recently created documents from the original result set 110.

Figure 2:
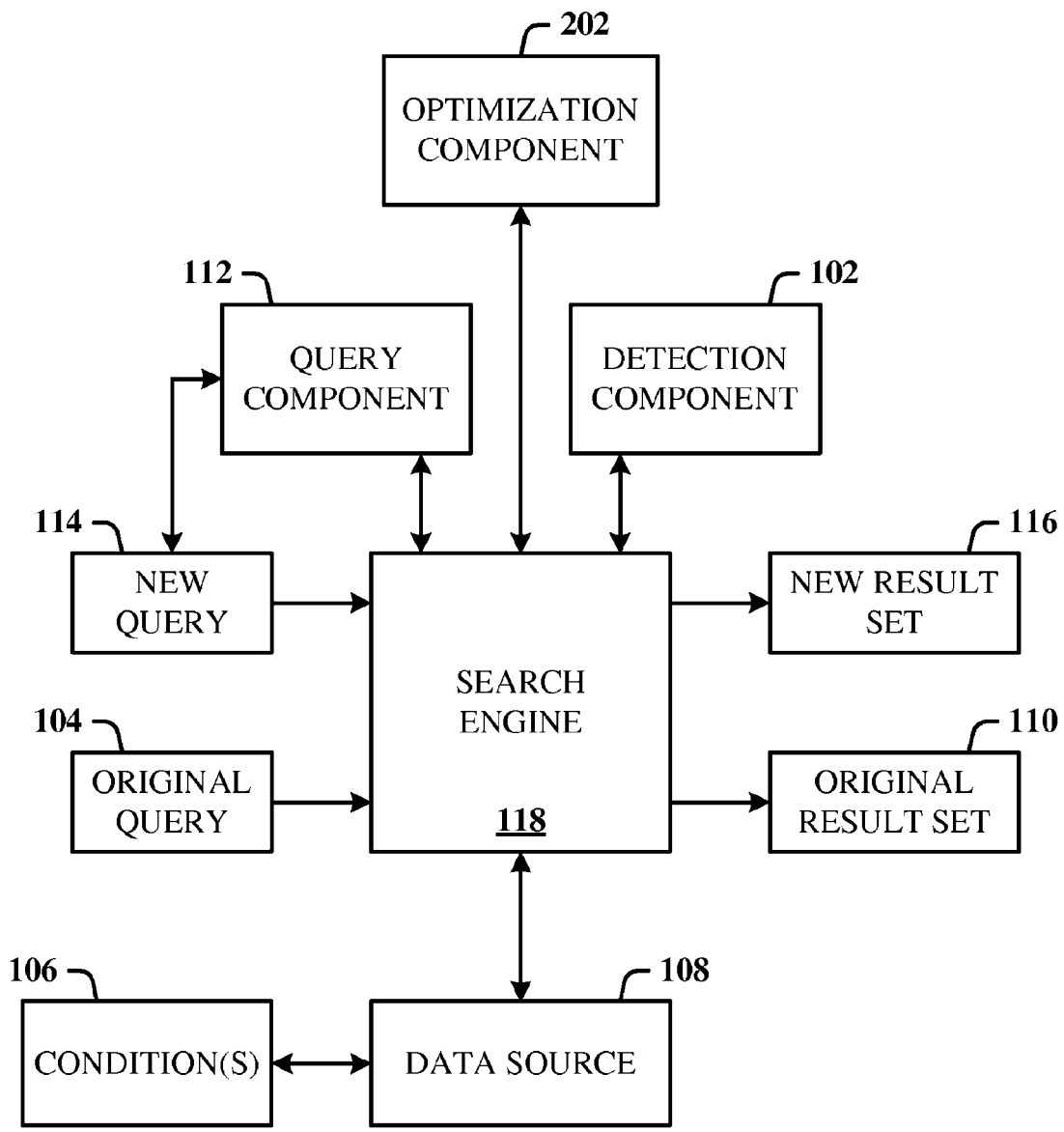
FIG. 2 illustrates an alternative system that employs an optimization component for query optimization.

FIG. 2 illustrates an alternative system 200 that employs an optimization component 202 for query optimization. The optimization component 202 optimizes the results of the new result set 116 by selecting one or more terms from the original query 104 to employ in the new query 114. The selection can be based on optimizing quality of the new result set 116 without triggering one or more of the conditions 106.

Alternatively, or in combination therewith, the optimization component 202 optimizes results of the new result set 116 by inserting one or more terms into the new query 114 where the one or more terms relate to a characteristic about an entity (e.g., user, other system) that generates the original query 104. Selection and insertion of the one or more terms optimize quality of the new result set 116 without triggering one or more of the conditions 106.

In yet another implementation, the optimization component 202 optimizes results of the new result set 116 by activating one or more of the conditions 106 of the data source 108 based on other criteria, such that inserting one or more terms into the new query 114 where the one or more terms relate to a characteristic about an entity (e.g., user, other system) that generates the original query 104. Selection and insertion of the one or more terms optimizes quality of the new result set 116 without triggering one or more of the conditions 106. For example, if the system 200 has sufficient information about the user (e.g., login, username, etc.), the system 200 can further gather metadata about the user such as the user group or team of which the user is a member in the company, the type of work the user performs, access historical logs about past searches the user has initiated, access a user preferences file that indicates how the user prefers to view the result sets, etc. This and other information can be synthesized by the optimization component 202 to provide a more qualitative search result for the user be selecting and inserting query terms that would provide a more desirable results set.

Where the entity is another system, information about the other system can be employed to more effectively provide qualitative search results. For example, if the other system is a financial system, it can be inferred that the terms to be inserted can be financial terms, rather than product terms. This can also be used to control the number of conditions 106 to actively control or request that be controlled to the data source 108. For example, if through historical information it is learned that a specific query routinely triggers a condition, the other system can request that a condition be imposed to limit the performance impact that may occur by processing the same query again. On the other hand, the system 200 could override the request given that the system 200 determines that the performance hit will not occur due to existing circumstances, such as it is after hours or current activity is at such a low level that the query will not impact current performance.

The optimization component 202 can employ more sophisticated mechanisms such as machine learning and reasoning, for example, which facilitates automation of one or more features. For example, a process for determining the query terms and/or term indices can be facilitated via an automatic classifier system and process.

A classifier is a function that maps an input attribute vector, $x=(x_1, x_2, x_3, x_4, \ldots, x_n)$, where n is a positive integer), to a class label class(x). The classifier can also output a confidence that the input belongs to a class, that is, $f(x)=confidence(class(x))$. Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

It is to be understood that the system 100 and system 200 can be implemented entirely or in part in a client system or a server system.

Figure 3:
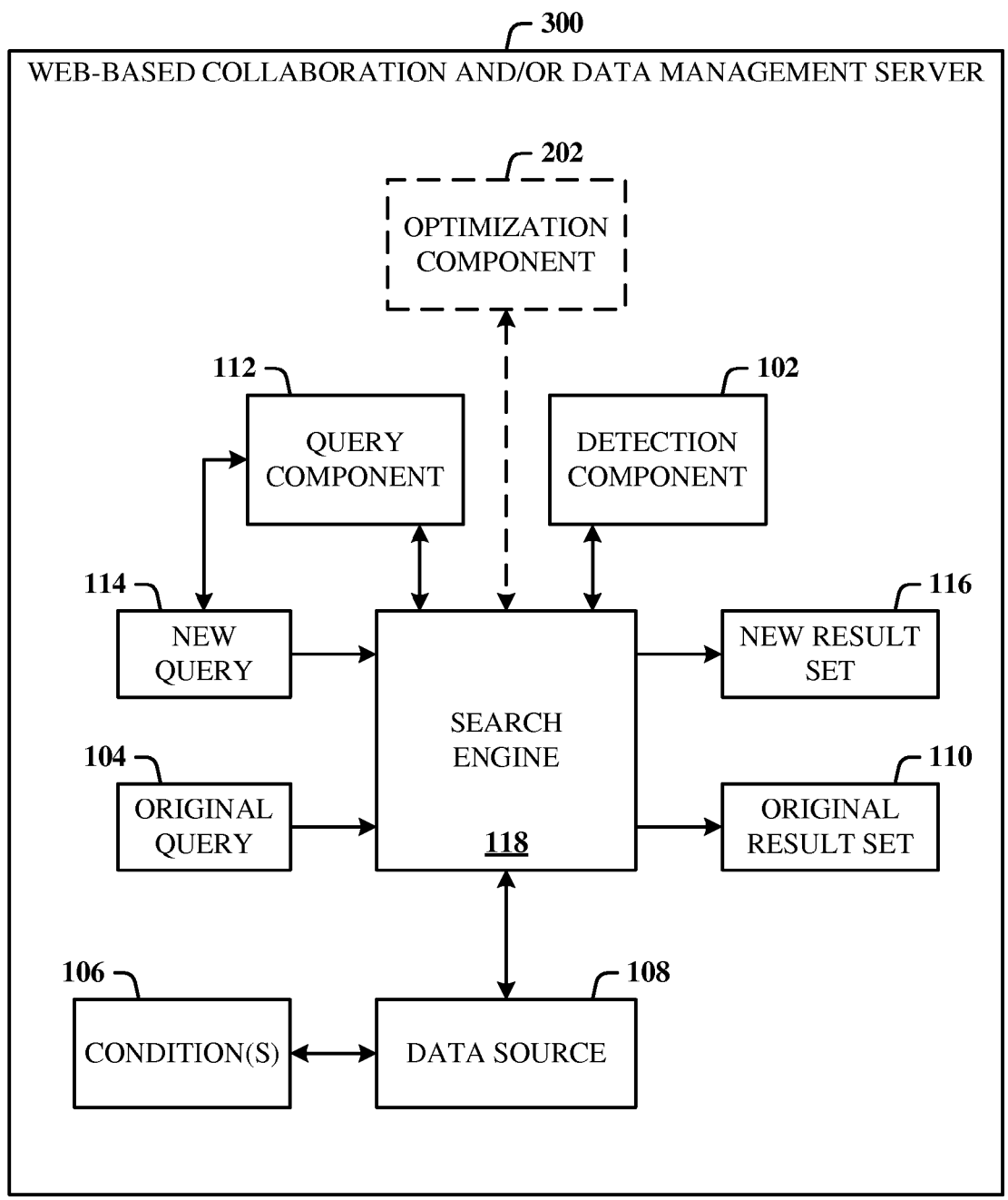
FIG. 3 illustrates that the detection component and the query component can be part of other systems to provide the enhanced functionality described herein.

FIG. 3 illustrates that the detection component 102 and the query component 112 can be part of other systems to provide the enhanced functionality described herein. For example, the system 100 of FIG. 1 or system 100 of FIG. 2 can be embodied in an enterprise web-based collaboration and/or data management server 300 that runs the original query 104 against the data source 108, which is an enterprise database. The optimization component 202 can be an optional implementation. The server 300 then provides, in one implementation, a guaranteed result set. In another embodiment, rather than a guaranteed set of results, there can be a probabilistic attempt at providing a result set. In other words, rather than rewriting the original query 104 into the new query 114 that guarantees a set of results (based on explicit information), the new query 114 is rewritten to provide some measure of probability of generating the new result set 116 that satisfies the one or more conditions 106. This means that the user (or other system) will receive a view of some results, whether the results ultimately prove to satisfy the user or not. For example, the optimization component 202 can gather information about the system, the user, etc., and rewrite the query based on this information to increase the likelihood that the query will be successful.

In the context of server systems that are provided to support a large number of users, the performance of the system can be an important factor in not only the overall user experience, but also to the corporate well-being, at least insofar as employee productivity is concerned.

Thus, FIG. 3 illustrates a computer-implemented query system comprising the detection component 102 of the web-based collaboration server 300 for detecting a failure of the original query 104 due an excessive number of items in the original result set 110 that triggers one of the conditions 106, which is a threshold condition.

The query system can further comprise the query component 112 of the web-based collaboration server 300 for automatically rewriting the original query 104 into the new query 114 in response to the detected failure of the original query 104, the new query 114 returns the new result set 116 that does not trigger the threshold condition.

In one instance, the new query 114 searches the most recent items of the original result set 110 to reduce the number of items of original result set 110 to the new result set 116. In another instance, the new query 114 searches the items of the original result set 110 to return the new result set 116. The new query 114 employs one or more terms associated with a filter, a group, or a sort. The query component 112 can selectively combine indices associated with the terms of the original query 104 to determine an optimal new query that returns the new result set 116.

In the following description, the disclosed fallback query mechanism is embodied in cooperation with a metadata navigation feature that utilizes a set of indices on the list in order to query for items in a large list. The settings for the metadata navigation drive the creation of appropriate supporting available indices for rewriting the original query into the new query. In the following specific implementation, the available indices are used in support the rewrite of CAML (collaborative application markup language) queries on list view pages so that the queries can succeed and perform on a large list. A representative partial set of items can be displayed using the fallback query when the original query is not sufficiently selective to return any results from the large list.

As previously discussed, large list semantics prevent users from running certain queries. Specifically, the first indexed subquery must return a result set smaller than this threshold (e.g., by default, 5,000 items). Conventionally, only individual columns are indexed, so in order to run a successful query, one column filter is specified that gets the result set below this threshold condition.

Compound indexing, on the other hand, allows the combining of two simultaneous column filters before getting below the threshold condition. For example, consider the return all documents where "Product=Widgets" and "Author=Max Powers". This query may still run without a compound index between "Team" and "Author". However, the compound index provides a greater likelihood of succeeding (without using the fallback logic) due to the more selective index in the compound index case.

Figure 4:
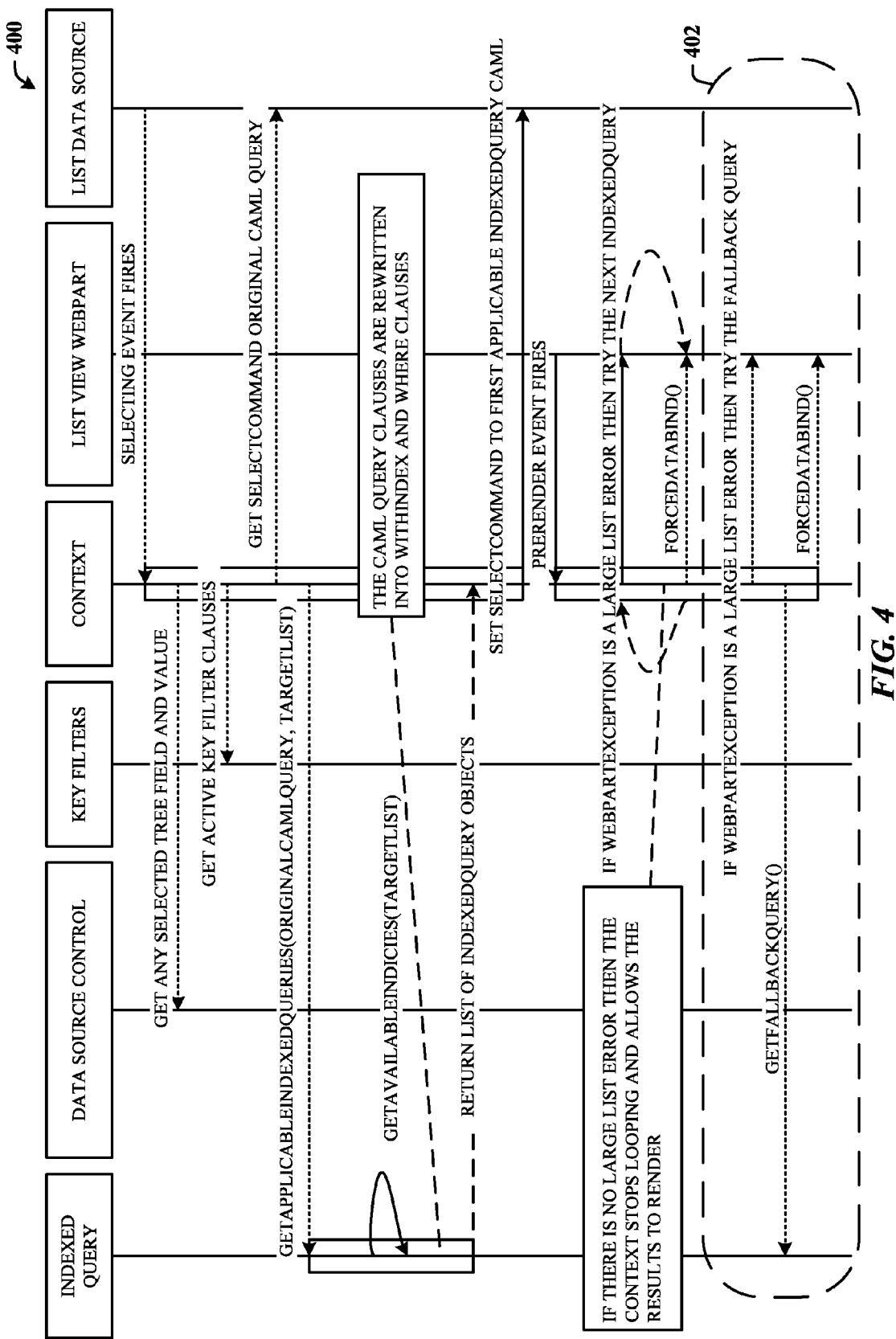
FIG. 4 illustrates a sequence diagram that represents the utilization of a fallback query.

FIG. 4 illustrates a sequence diagram 400 that represents the utilization of a fallback query. The sequence diagram 400 describes how a parent feature of metadata-driven navigation generates and runs queries against lists (e.g., SharePoint by Microsoft Corporation). The indexed query object is responsible for parsing and rewriting the applicable indexed queries. Note that this is only but one example of the fallback query mechanism implemented in a system. Moreover, this is only one example of a condition (an excessively large result set). In this particular implementation, the fallback query mechanism activates in the last three steps 402, which describe the sequence of actions taken when a query is failed due to large list rules.

The query cannot be satisfied with the conditions that were provided initially. The logic of fallback query in this specific limitation employs the most recent results items by date. In one implementation, this logic can be configured by an administrator. After identifying that a condition fails terms can be added to the original query to reduce the size of original result set to meet the conditions.

If the WebPartException step is a large list error, then the fallback query mechanism is activated to ensure that the user receives some result set to view. If a query is failed due to the query requesting more than LargeListThreshhold items from the database, then the fallback query is run. The GetFallbackQuery( ) method step takes the current query and rewrite the query to match the three constraints described above. The ForceDataBind( ) method step involves running the new rewritten query and displays the results to the user.

Following are details on GetFallbackQuery( ) method, which describe the structure of the various fallback queries in different situations. A first example illustrates indexed CAML fallback query types. It is to be understood that other programming languages can be employed for other suitable implementations.

Following is an example of an indexed top fallback query. The following case applies when the query has only two clauses, both of which are equality clauses and have a compound index. This results in the 5000 most recent items that match the two values. Note that the user's OrderBy clause cannot be maintained and the results will be sorted by descending item ID, which is equivalent to Created Date.

A Range operation refers to a Gte (greater than or equal) to operator and/or an Lte (less than or equal) to operator which, for the purposes of indexing, can be considered as one condition. Note that Date equality queries can be translated to a one day date range covering the day of the date value.

The indexed fallback describes which types will allow an "indexed top fallback query" to run for that operator and field type combination. Note that only equality (Eq) operators can get indexed fallback and MVL (multi-value lookup) type fields do not get indexed fallback. All other types run a "simple fallback query".

The following identifiers can be used in one implementation: SVL (single value lookup) includes Managed metadata, Users and simple lookup fields; CTID is the Content Type ID; SVC is Single Value Choice; MVL includes multi-value managed metadata, Users and simple lookup fields; Num (Number fields) includes number and currency field types; Date is Date time fields; and, YesNo is Yes/No Boolean fields (e.g., "Is Record").

The supported primary fields include SVL (single value lookup)—managed metadata, user, lookup, and contentTypeID. The supported secondary fields include SVL—managed metadata, user, lookup, and contentTypeID, Number (includes currency), YesNo (e.g. "Is Record"), and Date.

```
<Query>
    <WithIndex ID="CompoundIndexID">
        <And>
            <!-- Primary field operator (Only Eq is
    allowed here) -->
            <Eq>
                <FieldRef />
                <Value />
            </Eq>
            <!-- Secondary field operator (Only Eq is
    allowed here) -->
            <Eq>
                <FieldRef />
                <Value />
            </Eq>
        </And>
    </WithIndex>
    <OrderBy>IndexField1, ID Descending</OrderBy>
</Query>
```

The following case applies when the query has only one equality clause which has an available single index. This results in the 5000 most recent items that match the given value. Note: The user's OrderBy clause cannot be maintained and the results will be sorted by descending item ID, which is equivalent to Created Date. The supported field types include SVL—managed metadata, user, lookup, contentTypeID, and Single Value Choice.

```
<Query>
    <Where>
        <!- Single indexed field (Only Eq is allowed and no
    MVL fields) -->
        <Eq>
            <FieldRef />
            <Value />
        </Eq>
    </Where>
    <OrderBy>IndexField1, ID Descending</OrderBy>
</Query>
```

Following is an example of a simple fallback query. The simple fallback query limits to the 5000 most recently created items and then applies all filters and ordering from the original query. Note that this will return nothing if none of the latest 5000 items match. This query can be used for the rest of the possible cases, including the following: a query using operators not supported with indexed fallback (In, Range, etc); any query with other clauses beyond the indexed Eq clauses described above; field types not supported in fallback (e.g., DateTime, since this queries as a one-Day range or MVL managed metadata, user, lookup, etc.); and any queries, including non-indexed fields or clauses.

```
<Query>
    <Where>
        <And>
            <Gte>
                <FleidRef Name="ID" />
                <Value>SPList.ItemCount – {max
    items threshold}</Value>
            </Gte>
            <And>
                <!-- Remainder of CAML Query -->
            </And>
        </And>
    </Where>
    <OrderBy><!-- User specified order by goes
here --></OrderBy>
</Query>
```

The capability can be added to extend cases of the indexed top fallback query and the simple fallback query to include other non-indexed clauses in the query and a user specified order-by. These ID limit fallback queries can still utilize a supported single indexed [Eq] (not including MVL) or compound indexed [Eq-Eq] clause as done in the indexed top fallback query and the simple fallback query. Performing an "indexed ID limited fallback" query uses two round trips: one for a "pre-fallback limit finding" query operation and one for the actual results of the "indexed ID limited fallback."

The pre-fallback is essentially an "indexed top fallback" with the following features: only one [Eq] or [Eq-Eq] clause from the original query, a RowLimit set to 90% of the threshold, and executed only in order to find the last item ID in the result set for that index, called the "lower limit item ID."

With this limit ID known, the original non-fallback indexed query can be performed using the same [Eq] or [Eq-Eq] index, but including a new clause limiting the "ID>LowerLimitId." The rest of the user clauses and ordering will be respected. The pre-scan allows this query to execute since it can tell that the index combined with the item ID range limit will return less than the threshold and it does not need to rely on a "top N" sorting.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
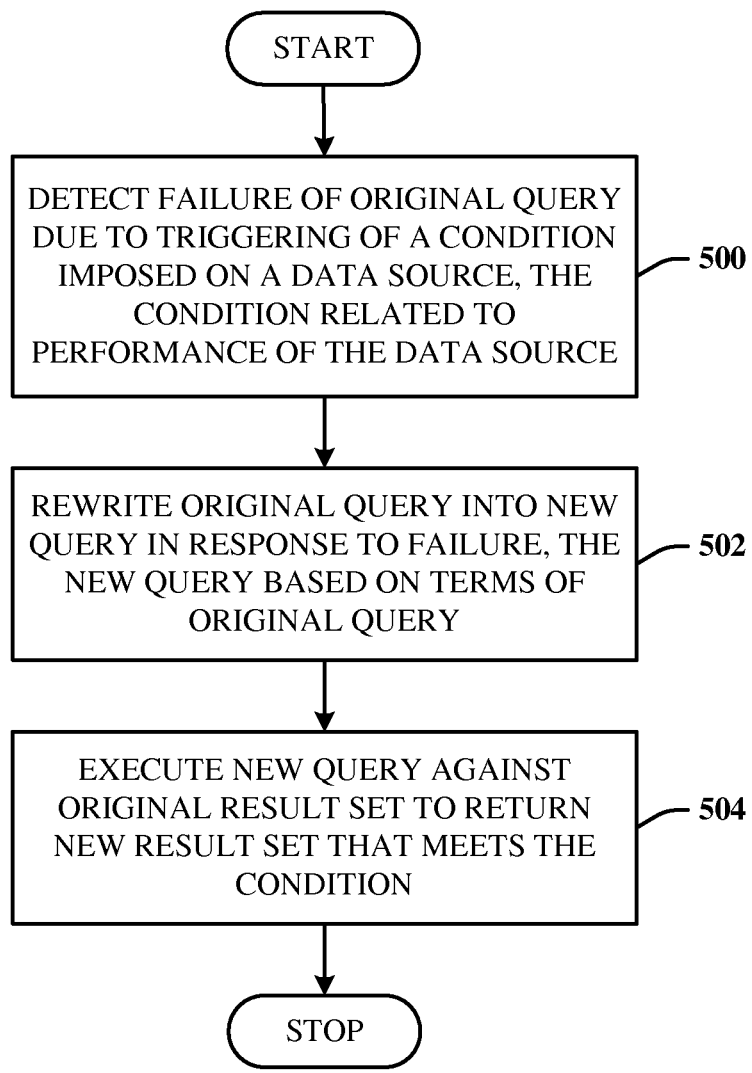
FIG. 5 illustrates a method of processing a query.

FIG. 5 illustrates a method of processing a query. At 500, a failure is detected of an original query due to triggering of a condition imposed on a data source against which the original query is run, the condition related to performance of the data source. At 502, the original query is rewritten into a new query in response to the failure, the new query based on terms of the original query. At 504, the new query is executed against the original result set to return a new result set that meets the condition.

The method can further comprise rewriting the original query into the new query such that the new result set includes a number of items that does not exceed a maximum-number-of-items threshold condition. The new query can be built based on compound indices of the terms of the original query. Moreover, the filtering and ordering associated with the original query can be applied to the new query. As indicated hereinabove, the new query can be an indexed top fallback query, a simple fallback query, or an ID limit fallback query. The new query returns results in the new result set that match terms defined in the original query.

In accordance with the next method, the original query can be rewritten into the new query based on a type of the condition imposed on the data source.

Figure 6:
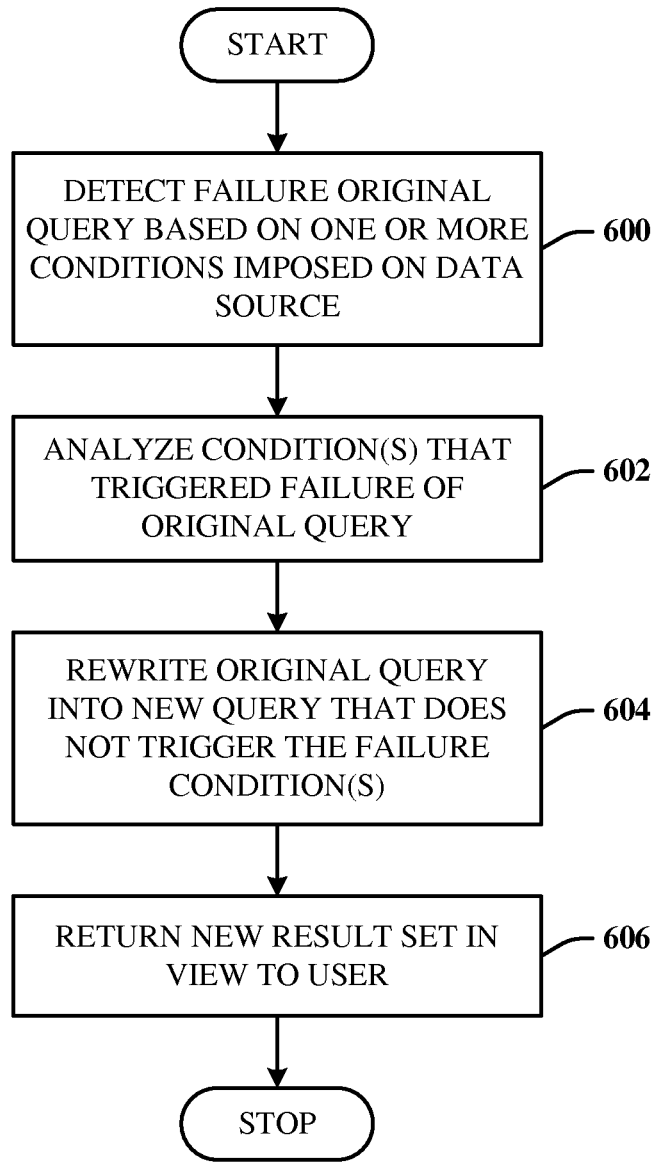
FIG. 6 illustrates a method of creating the new query based on one or more conditions imposed on the data source.

FIG. 6 illustrates a method of creating the new query based on one or more conditions imposed on the data source. At 600, a failure of the original query is detected based on one or more conditions (e.g., large list threshold) imposed on the data source. At 602, the condition(s) of the data source that triggered the failure are analyzed. At 604, the original query is rewritten into a new query that does not trigger the failure condition(s). At 606, the new result set is returned in the view to the user.

Figure 7:
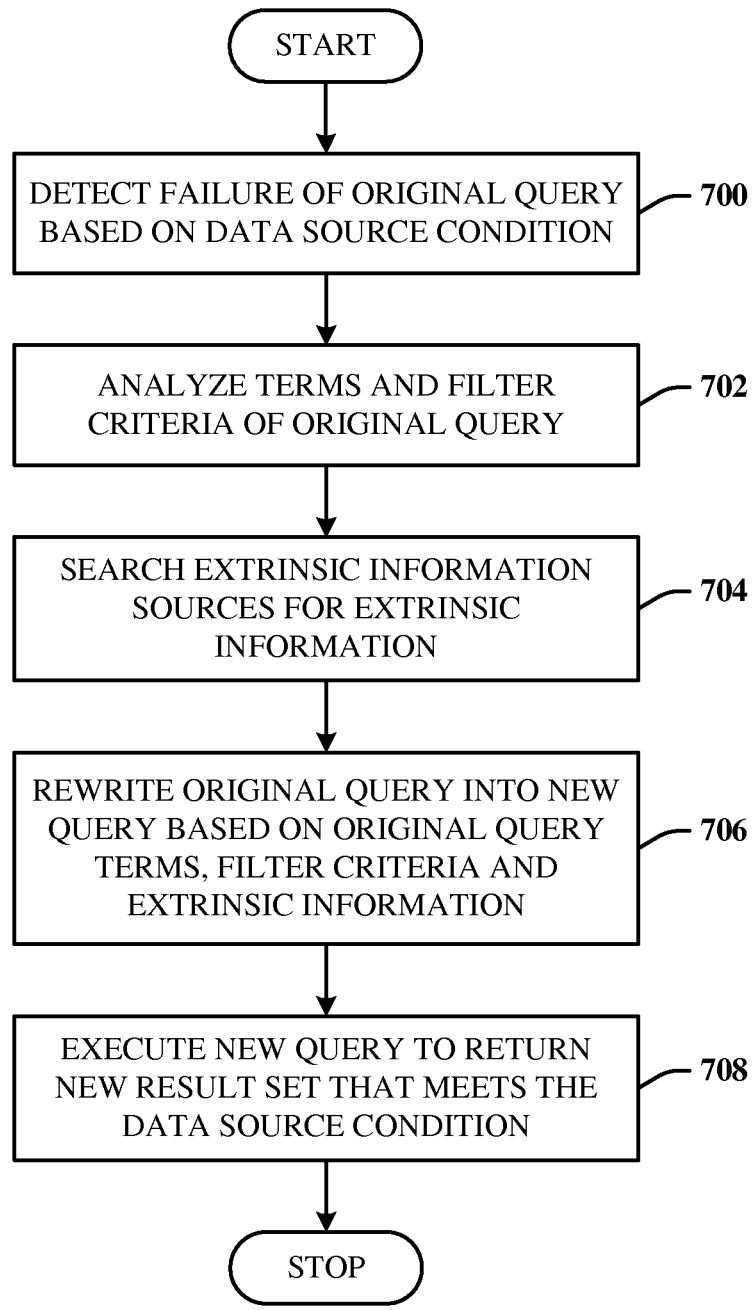
FIG. 7 illustrates a method of rewriting a new query based on the original query and extrinsic information.

FIG. 7 illustrates a method of rewriting a new query based on the original query and extrinsic information. The extrinsic information can include information about the user such as membership in a team or group, project the user is working on, experience, user name, collaborators with the user, etc. At 700, a failure of the original query is detected based on a data source condition. At 702, analysis is performed on terms and filter criteria of the original query. At 704, a search is performed on extrinsic data sources for extrinsic information. At 706, the original query is rewritten into a new query based on the original query terms, filter criteria and extrinsic information. At 708, the new query is executed to return a new result set that meets the data source condition.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
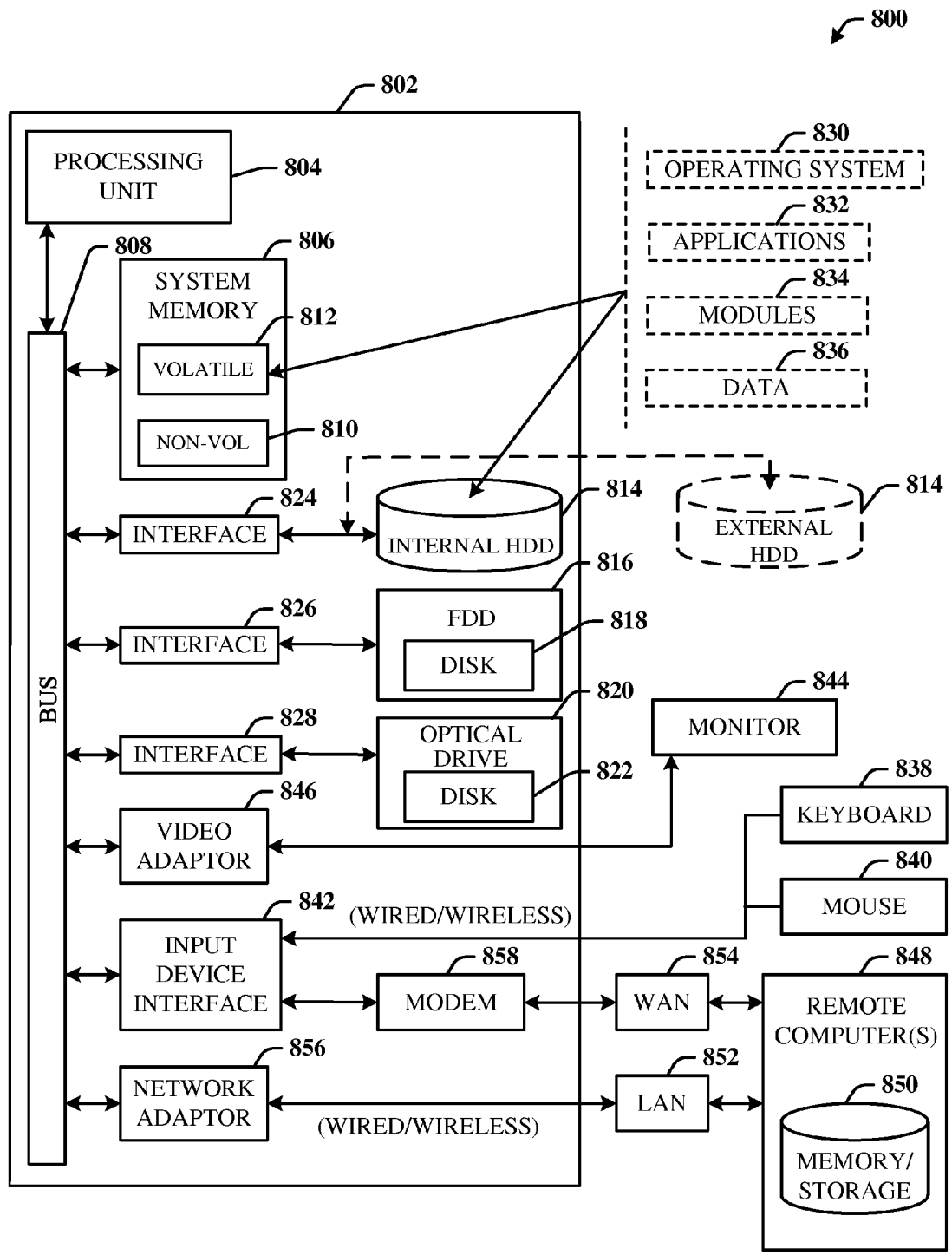
FIG. 8 illustrates a block diagram of a computing system operable to execute the fallback query architecture disclosed herein.

Referring now to FIG. 8, there is illustrated a block diagram of a computing system 800 operable to execute the fallback query architecture disclosed herein. In order to provide additional context for various aspects thereof, FIG. 8 and the following discussion are intended to provide a brief, general description of a suitable computing system 800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary computing system 800 for implementing various aspects includes a computer 802 having a processing unit 804, a system memory 806 and a system bus 808. The system bus 808 provides an interface for system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 can include non-volatile memory (NON-VOL) 810 and/or volatile memory 812 (e.g., random access memory (RAM)). A basic input/output system (BIOS) can be stored in the non-volatile memory 810 (e.g., ROM, EPROM, EEPROM, etc.), which BIOS are the basic routines that help to transfer information between elements within the computer 802, such as during start-up. The volatile memory 812 can also include a high-speed RAM such as static RAM for caching data.

The computer 802 further includes an internal hard disk drive (HDD) 814 (e.g., EIDE, SATA), which internal HDD 814 may also be configured for external use in a suitable chassis, a magnetic floppy disk drive (FDD) 816, (e.g., to read from or write to a removable diskette 818) and an optical disk drive 820, (e.g., reading a CD-ROM disk 822 or, to read from or write to other high capacity optical media such as a DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 812, including an operating system 830, one or more application programs 832, other program modules 834, and program data 836. The one or more application programs 832, other program modules 834, and program data 836 can include the detection component 102, the original query 104, the condition(s) 106, the data source 108, the original result set 110, the query component 112, the new query 114, the new result set 116 and the search engine 118, and the optimization component 202, for example. The computer 802 can be employed as a client system and/or a server system.

All or portions of the operating system, applications, modules, and/or data can also be cached in the volatile memory 812. It is to be appreciated that the disclosed architecture can be implemented with various commercially available operating systems or combinations of operating systems.

A user can enter commands and information into the computer 802 through one or more wire/wireless input devices, for example, a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, etc.

A monitor 844 or other type of display device is also connected to the system bus 808 via an interface, such as a video adaptor 846. In addition to the monitor 844, a computer typically includes other peripheral output devices (not shown), such as speakers, printers, etc.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, is connected to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
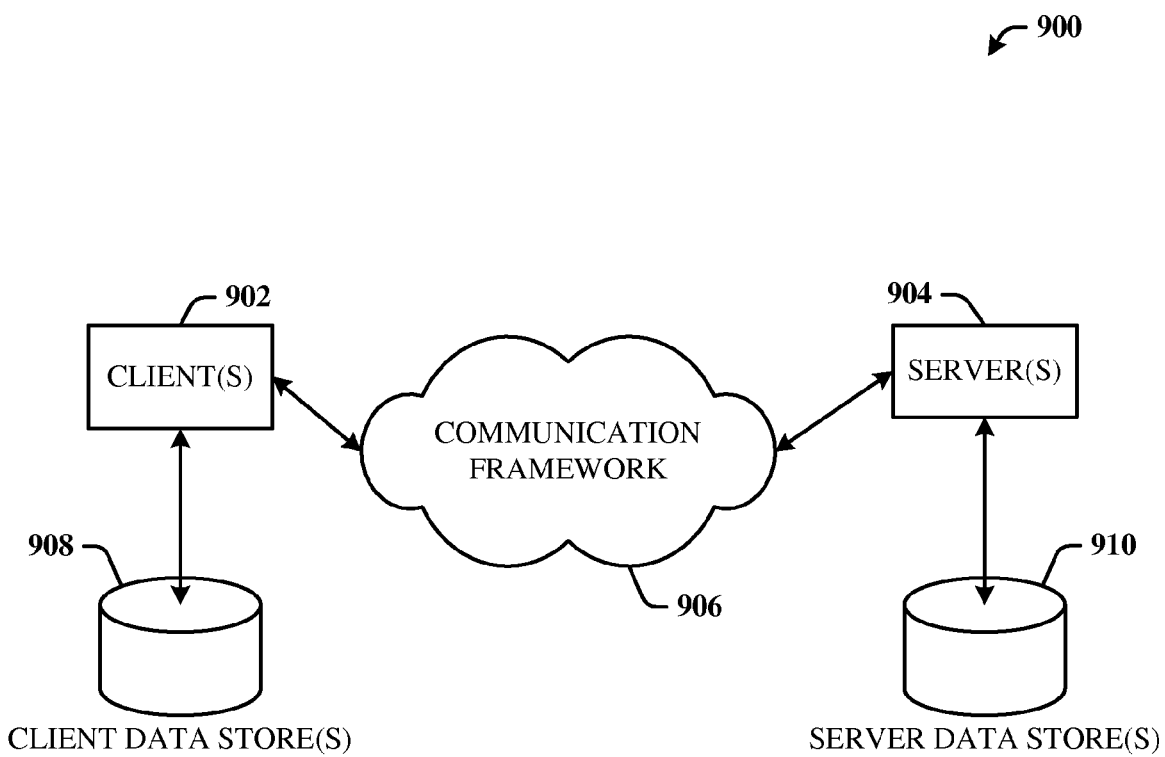
FIG. 9 illustrates schematic block diagram of an exemplary computing environment that facilitates optimization of data source queries.

Referring now to FIG. 9, there is illustrated a schematic block diagram of an exemplary computing environment 900 that facilitates optimization of data source queries. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The client(s) 902 can include a computing system or device via which the user (or other entity) initiates the original query to the server(s) 904. The server data stores(s) 910 can be the data source against which the original query will be run. The server(s) 904 can also include the one or more conditions (or rules) imposed on a server that operate to fail the queries when query execution may impact server performance based on predetermined configuration settings. The conditions can consider server hardware makeup, network bandwidth at the time of the query, complexity of the query, server software version and capabilities, and so on.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented query system, comprising:
   a processor for executing computer-executable components; and memory storing computer-executable components including:
   a detection component for detecting a failure condition when a number of items to be returned from a data source in response to an original query exceeds a maximum number of items that can be returned from the data source and for terminating query execution processing of the original query against the data source; and
   a query component for automatically returning, in response to the detected failure condition, a partial result set having a number of items that does not exceed the maximum number of items by:
      automatically selecting a particular query term from a plurality of query terms specified in the original query,
      automatically generating a reduced result set limited to a threshold number of most recently created items of the data source that match the particular query term selected from the original query, wherein the threshold number does not exceed the maximum number of items,
      automatically generating the partial result set from the reduced result set by applying one or more remaining query terms specified in the original query to filter the reduced result set, and
      automatically returning the partial result set for viewing.

2. The system of claim 1, wherein:
   the detection component and the query component are part of an enterprise web-based collaboration and data management server, and
   the data source is an enterprise database.

3. The system of claim 1, wherein the query component further applies one or more remaining query terms specified in the original query to order the partial result set.

4. The system of claim 3, wherein the one or more remaining query terms specified in the original query to order the partial result set comprise one or more of groups and sorts.

5. The system of claim 1, wherein the threshold number is a set percentage of the maximum number of items that can be returned from the data source.

6. The system of claim 1, further comprising an optimization component for selecting the particular query term from the plurality of query terms specified in the original query to optimize quality of the partial result set.

7. The system of claim 1, further comprising an optimization component for automatically optimizing quality of the partial result set based on one or more terms which are not specified in the original query.

8. A computer-implemented method, comprising:
   detecting, by a server computer, a failure condition when a number of items to be returned from a data source in response to an original query exceeds a maximum number of items that can be returned from the data source;
   terminating, by the server computer, query execution processing of the original query against the data source; and automatically returning, by the server computer in response to the detected failure condition, a partial result set having a number of items that does not exceed the maximum number of items by:
  automatically selecting a particular query term from a plurality of query terms specified in the original query,
  automatically generating a reduced result set limited to a threshold number of most recently created items of the data source that match the particular query term selected from the original query, wherein the threshold number does not exceed the maximum number of items,
  automatically generating the partial result set from the reduced result set by applying one or more remaining query terms specified in the original query to filter the reduced result set, and
  automatically returning the partial result set for viewing.

9. The method of claim 8, wherein the threshold number is a set percentage of the maximum number of items that can be returned from the data source.

10. The method of claim 8, further comprising:
selecting, by the server computer, the particular query term from the plurality of query terms specified in the original query to optimize quality of the partial result set.

11. The method of claim 8, further comprising:
automatically optimizing, by the server computer, quality of the partial result set based on one or more terms which are not specified in the original query.

12. The method of claim 8, further comprising:
applying, by the server computer, one or more remaining query terms specified in the original query to order the partial result set.

13. The method of claim 12, wherein the one or more remaining query terms specified in the original query to order the partial result set comprise one or more of groups and sorts.

14. The method of claim 8, wherein the particular query term selected from the original query is an indexed equality clause.

15. A computer storage medium storing computer-executable instructions that, when executed, cause a computing device to perform steps comprising:
  detecting a failure condition when a number of items to be returned from a data source in response to an original query exceeds a maximum number of items that can be returned from the data source;
  terminating query execution processing of the original query against the data source; and
  automatically returning, in response to the detected failure condition, a partial result set having a number of items that does not exceed the maximum number of items by:
    automatically selecting a particular query term from a plurality of query terms specified in the original query,
    automatically generating a reduced result set limited to a threshold number of most recently created items of the data source that match the particular query term selected from the original query, wherein the threshold number does not exceed the maximum number of items,
    automatically generating the partial result set from the reduced result set by applying one or more remaining query terms specified in the original query to filter the reduced result set, and
    automatically returning the partial result set for viewing.

16. The computer storage medium of claim 15, wherein the threshold number is a set percentage of the maximum number of items that can be returned from the data source.

17. The computer storage medium of claim 15, further storing computer-executable instructions for selecting the particular query term from the plurality of query terms specified in the original query to optimize quality of the partial result set.

18. The computer storage medium of claim 15, further storing computer-executable instructions for automatically optimizing quality of the partial result set based on one or more terms which are not specified in the original query.

19. The computer storage medium of claim 15, further storing computer-executable instructions for applying one or more remaining query terms specified in the original query to order the partial result set.

20. The computer storage medium of claim 19, wherein the one or more remaining query terms specified in the original query to order the partial result set comprise one or more of groups and sorts.

* * * * *